(12) United States Patent
Pierson

(10) Patent No.: US 6,215,676 B1
(45) Date of Patent: Apr. 10, 2001

(54) SELECTIVE VOLTAGE MULTIPLIER FOR TOY MODEL TRAIN WITH AUDIO SYSTEM

(75) Inventor: Martin D. Pierson, Howell, MI (US)

(73) Assignee: Lionel Trains, Inc., Chesterfield, MI (US)

( * ) Notice: Subject to any disclaimer, the term of this patent is extended or adjusted under 35 U.S.C. 154(b) by 0 days.

(21) Appl. No.: 09/185,359

(22) Filed: Nov. 3, 1998

(51) Int. Cl.$^7$ .................................................. H02M 3/18
(52) U.S. Cl. ............................................................. 363/59
(58) Field of Search .................................. 363/59, 60, 61

(56) References Cited

U.S. PATENT DOCUMENTS

| | | | |
|---|---|---|---|
| 3,713,018 | 1/1973 | Tscheuschner | 321/15 |
| 3,900,787 | 8/1975 | Koster | 321/15 |
| 4,656,571 | 4/1987 | Umezu | 363/37 |
| 4,805,083 | 2/1989 | Konopka | 363/143 |
| 5,097,402 | 3/1992 | Kriz et al. | 363/61 |
| 5,162,984 | 11/1992 | Castagnet et al. | 363/61 |
| 5,555,815 | * 9/1996 | Young et al. | 104/296 |
| 5,684,682 | 11/1997 | Zhong et al. | 363/59 |

OTHER PUBLICATIONS

Forrest M. Mims III, *Getting Started in Electronics*, p. 102, Cat. No. 62–5003 (Radio Shack—A Division of Tandy Corporation, 13th edition, 1996), No Month.

Forrest M. Mims III, *Engineer's Mini–Notebook—Basic Semiconductor Circuits*, p. 19, Cat. No. 62–5013 (Radio Shack—A Division of Tandy Corporation, 7th edition, 1997), No Month.

* cited by examiner

*Primary Examiner*—Jessica Han
(74) *Attorney, Agent, or Firm*—Young & Basile, P.C.

(57) ABSTRACT

A selective voltage multiplier for a toy model train with an audio system that is activated by an input voltage, the selective voltage multiplier including either a voltage doubler or tripler multiplier circuit; a DC voltage source and a voltage divider circuit together establishing a reference voltage; an operational amplifier comparator for comparing the input voltage with the reference voltage, the comparator producing an output signal depending on whether the reference voltage exceeds the input voltage; an opto-isolator for selectively enabling the voltage multiplier circuit depending on the output signal of the comparator; and a speaker system.

9 Claims, 5 Drawing Sheets

SELECTIVE VOLTAGE MULTIPLIER FOR TOY MODEL TRAIN WITH AUDIO SYSTEM

FIELD OF THE INVENTION

The present invention relates to a selective voltage multiplier for an electric toy model train which includes an audio speaker system.

BACKGROUND OF THE INVENTION

Electric toy model trains typically include an electronic audio speaker system incorporated within the locomotive engine car of the train to provide simulated locomotive warning horn or whistle sounds. Typically, voltage power is supplied to the audio speaker system of the locomotive engine car via one of the rails of the train track.

Toy model trains typically include an electronic user control box electrically connected to one or more of the train track rails. The control box typically has one or more levers, dials, or buttons which are manually adjustable and manipulatable by the user. In this way, the control box enables the user to manually control the voltage levels supplied to the electronic systems and motor of the locomotive engine car to control the toy train's speed, direction, and sounds.

In the past, a problem would often arise when the user would decrease the voltage supplied to the locomotive engine car to slow it down or stop it. Such a decrease in voltage supplied to the engine car would then make it impossible to activate the audio speaker system in the engine car because the decreased supply voltage would be inadequate to drive the speaker system. To solve this problem, a voltage doubler circuit or other voltage multiplier circuit was incorporated within the audio system of the engine car to ensure that the audio system could be properly activated with appropriately high voltage levels, even when the locomotive engine car itself was slowed down or stopped.

However, providing a voltage doubler created other problems. In particular, when a user increased the voltage supplied to the locomotive engine car to move the engine car at high rates of speed along the train track, the voltage doubler would automatically step up the voltage supplied to the audio system. As a result of such an increase in voltage, the various electrical components incorporated within the audio system needed to have higher voltage capacities. Despite the relatively high cost of such high capacity components, they often overheated and occasionally catastrophically failed.

SUMMARY OF THE INVENTION

The present invention provides for a method and an apparatus which selectively multiplies an input voltage applied to an audio speaker system in an electric toy model train. The method includes establishing a reference voltage and comparing the input voltage to the reference voltage. The input voltage is then multiplied if the reference voltage exceeds the input voltage.

The invention also provides for an electric audio speaker system for a toy model train powered by an input voltage which includes a selectively activated voltage multiplier which supplies a particular voltage to the audio system depending on whether the input voltage is below a predetermined voltage level.

One aspect of the invention includes an audio system for an electric toy model train which includes a multiplier circuit, which multiplies an input voltage, and a means for establishing a reference voltage. A comparator circuit is also provided which compares the input voltage with the reference voltage. The comparator circuit produces an output signal generally depending on whether the reference voltage exceeds the input voltage. An optical enabler enables the multiplier circuit and is electrically connected between the comparator circuit and the multiplier circuit. The optical enabler selectively enables the multiplier circuit depending on the output signal of the comparator circuit.

DETAILED DESCRIPTION OF THE PREFERRED EMBODIMENTS

The preferred structures and operation of the selective voltage multiplier for a toy model train interfaced with an audio speaker system, according to the present invention, are set forth hereinbelow. The invention described hereinbelow may be generally used with any audio speaker system incorporated within a toy model train, including, for example, the general speaker system disclosed in U.S. Pat. No. 5,555,815, the specification and drawings of which are incorporated herein by reference.

Figure 1:
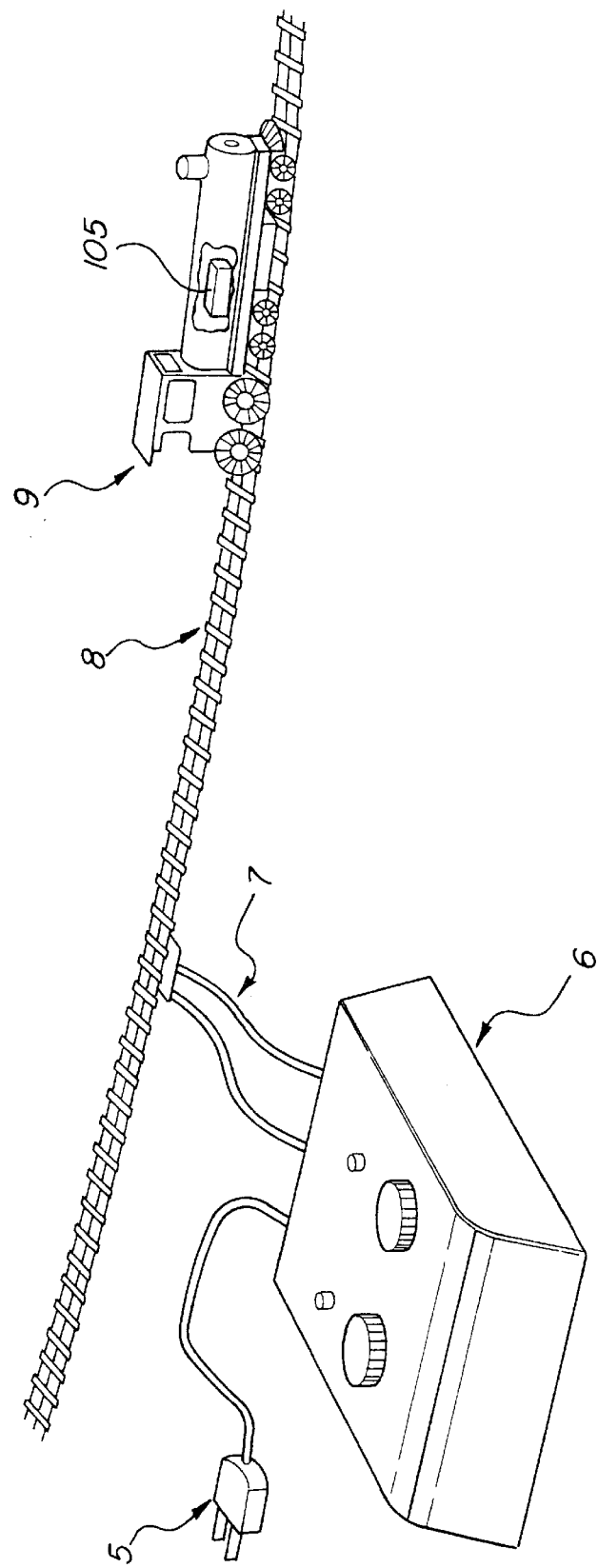
FIG. 1 is a perspective drawing illustrating the basic components of a toy model train in which the present invention resides.

With reference to FIG. 1, there is illustrated a perspective drawing of the basic components of a toy model train. In particular, a locomotive engine car 9 is shown seatingly engaged upon a train track 8. The train track 8 is electrically connected, via wires 7, to a user control box 6. User control box 6, in turn, is electrically connected to a plug 5. Plug 5 is adapted to provide electrical interface access to an electricity source, such as a standard electrical wall socket. Within the locomotive engine car 9, there is incorporated an on-board electronic control system 105.

Figure 2:
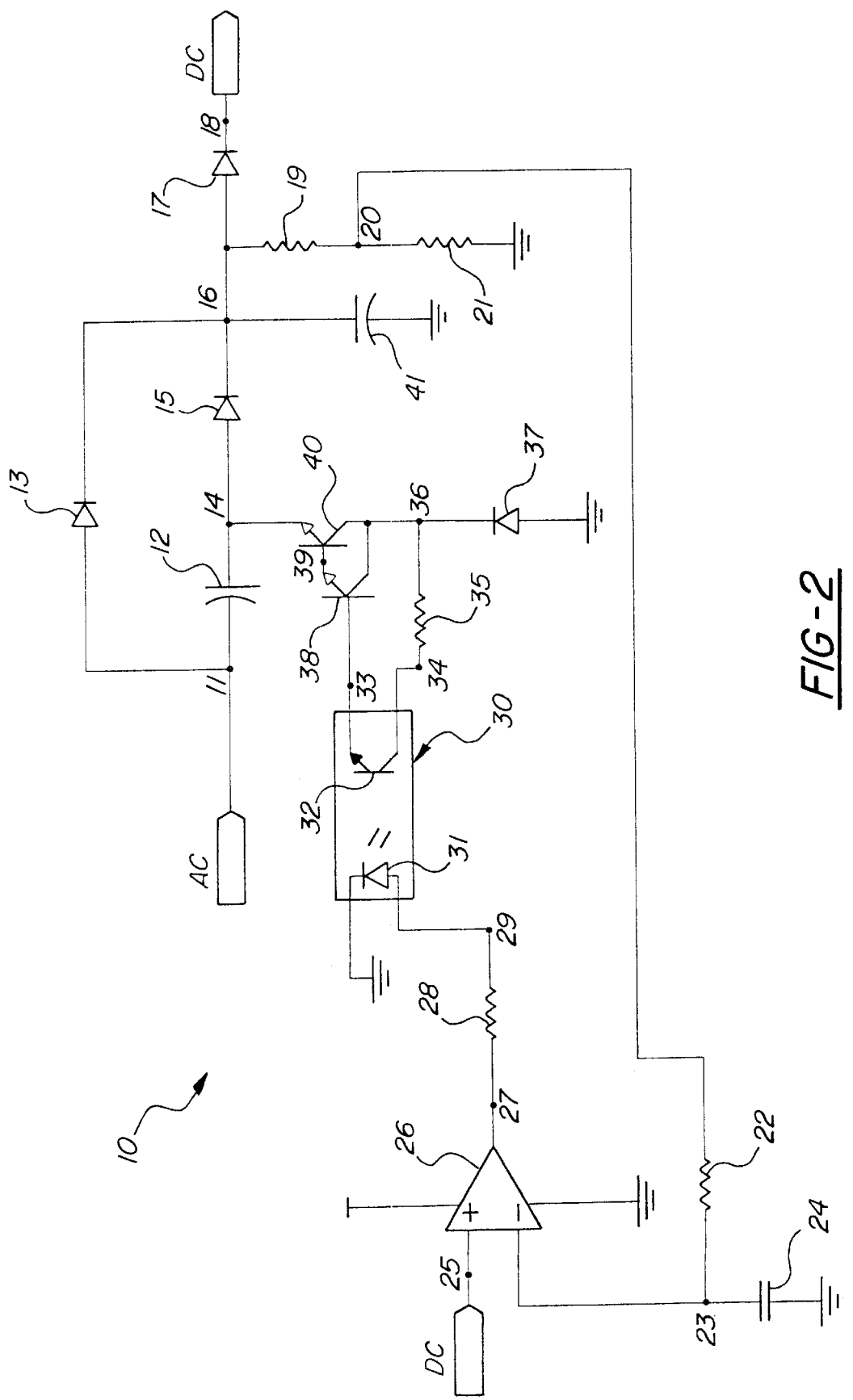
FIG. 2 is a circuit diagram of the present invention.

With reference to FIG. 2, there is shown a detailed circuit diagram of a modified, selectively enabled voltage doubler 10. Input AC voltage signals are to be applied at a circuit node 11, and output DC voltage signals are produced at a circuit node 18.

A polarized capacitor 12 is electrically connected between node 11 and a circuit node 14 such that the positive lead of polarized capacitor 12 is connected to node 14, and the negative lead of polarized capacitor 12 is connected to node 11. In general, capacitor 12 may be any known type of polarized capacitor, including, for example, either an electrolytic capacitor or a tantalum capacitor.

A diode 13 is electrically connected between the node 11 and a circuit node 16 such that the anode of diode 13 is connected to node 11, and the cathode of diode 13 is connected to node 16. A diode 15 is electrically connected between node 14 and node 16 such that the anode of diode 15 is connected to node 14, and the cathode of diode 15 is connected to node 16. Also, a diode 17 is electrically connected between node 16 and node 18 such that the anode of diode 17 is connected to node 16, and the cathode of diode 17 is connected to node 18. A polarized capacitor 41 is electrically connected between node 16 and electrical ground such that the positive lead of polarized capacitor 41 is connected to node 16, and the negative lead of polarized capacitor 41 is connected to electrical ground. In general, capacitor 41 may be any known type of polarized capacitor, including, for example, either an electrolytic capacitor or a tantalum capacitor.

A resistor 19 is electrically connected between node 16 and a circuit node 20, whereas a resistor 21 is electrically connected between node 20 and electrical ground. A resistor 22 is electrically connected between node 20 and a circuit node 23. A non-polarized capacitor 24 is electrically connected between node 23 and electrical ground. In general, capacitor 24 may be any known type of non-polarized capacitor, including, for example, a ceramic disc capacitor, a mica capacitor, a paper capacitor, or a synthetic film capacitor.

Non-polarized capacitor 24 and resistor 22 are both electrically connected to the inverting input of an inverting op-amp (operational amplifier) comparator 26 via node 23. The non-inverting input of op-amp comparator 26 is electrically connected to a circuit node 25. A predetermined, fixed DC reference voltage is applied, via node 25, to the non-inverting input of op-amp comparator 26. The desired reference voltage itself can be precisely determined and established, for example, by coupling a voltage divider circuit with a DC voltage source. The output of op-amp comparator 26 is electrically connected to a circuit node 27. A resistor 28 is electrically connected between node 27 and a circuit node 29.

Furthermore, node 29 is also electrically connected to the anode of an LED (light-emitting diode) 31 of an opto-isolator 30. The cathode of LED 31 is electrically connected to electrical ground. A photo-transistor 32 of opto-isolator 30 is electrically connected between a circuit node 33 and a circuit node 34 such that the emitter lead of photo-transistor 32 is electrically connected to node 33, and the collector lead of photo-transistor 32 is electrically connected to node 34. Photo-transistor 32 is an NPN-type transistor and is positioned relative to LED 31 in optical isolation so that LED 31 and photo-transistor 32 are optically linked whenever current passes through LED 31 and light emits therefrom. In this way, any light energy that is emitted from LED 31 provides photo-transistor 32 with an activating base signal and permits passage of current from the collector to the emitter of photo-transistor 32. As an alternative to utilizing the photo-transistor 32, other photo-sensors may instead be used in the opto-isolator 30 as well, such as, for example, a photo-resistor, a photo-diode, or a LASCR (light-activated silicon controlled rectifier).

A resistor 35 is electrically connected between node 34 and a circuit node 36. A diode 37, in turn, is electrically connected between node 36 and electrical ground such that the cathode of diode 37 is connected to node 36, and the anode of diode 37 is connected to electrical ground. In addition, node 36 is also electrically connected to the collector lead of an NPN-type BJT (bipolar junction transistor) 38 while the base lead of transistor 38 is electrically connected to node 33. The emitter lead of transistor 38 is electrically connected to a circuit node 39. Concerning an NPN-type BJT transistor 40, node 36 is electrically connected to the collector lead of the transistor 40 while the base lead of transistor 40 is electrically connected to node 39. The emitter lead of transistor 40 is electrically connected to node 14.

Figure 3:
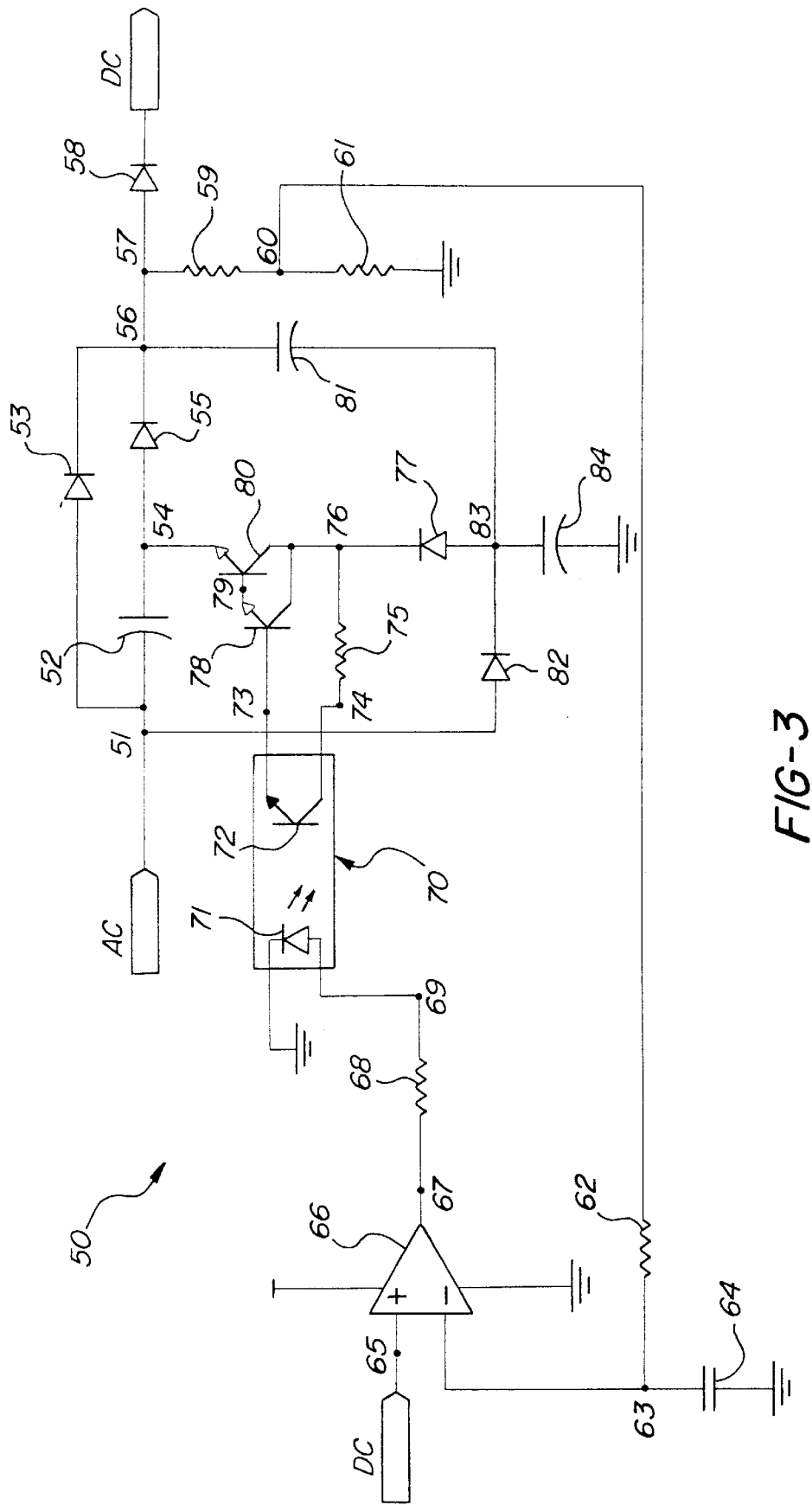
FIG. 3 is a circuit diagram of an alternate embodiment of the present invention.

With reference to FIG. 3, there is shown a detailed circuit diagram of a modified, selectively enabled voltage tripler 50. Input AC (alternating current) voltage signals are to be applied at a circuit node 51, and output DC (direct current) voltage signals are produced at a circuit node 58.

A polarized capacitor 52 is electrically connected between a node 51 and a circuit node 54 such that the positive lead of a polarized capacitor 52 is connected to node 54, and the negative lead of the polarized capacitor 52 is connected to node 51. In general, capacitor 52 may be any known type of polarized capacitor, including, for example, either an electrolytic capacitor or a tantalum capacitor.

A diode 53 is electrically connected between node 51 and a circuit node 56 such that the anode of diode 53 is connected to node 51, and the cathode of diode 53 is connected to node 56. A diode 55 is electrically connected between node 54 and node 56 such that the anode of the diode 55 is connected to node 54, and the cathode of diode 55 is connected to node 56.

Also, a diode 57 is electrically connected between node 56 and node 58 such that the anode of diode 57 is connected to node 56, and the cathode of diode 57 is connected to node 58. A polarized capacitor 81 is electrically connected between node 56 and a circuit node 83 such that the positive lead of polarized capacitor 81 is connected to node 56, and the negative lead of polarized capacitor 81 is connected to node 83. In general, capacitor 81 may be any known type of polarized capacitor, including, for example, either an electrolytic capacitor or a tantalum capacitor.

A resistor 59 is electrically connected between node 56 and a circuit node 60, whereas a resistor 61 is electrically connected between node 60 and electrical ground. A resistor 62, on the other hand, is electrically connected between node 60 and a circuit node 63. A non-polarized capacitor 64 is electrically connected between node 63 and electrical ground. In general, the capacitor 64 may be any known type of non-polarized capacitor, including, for example, a ceramic disc capacitor, a mica capacitor, a paper capacitor, or a synthetic film capacitor.

Non-polarized capacitor 64 and resistor 62 are both electrically connected to the inverting input of an inverting op-amp comparator 66 via node 63. The non-inverting input of op-amp comparator 66 is electrically connected to a circuit node 65. A predetermined, fixed DC reference voltage can be applied, via node 65, to the non-inverting input of op-amp comparator 66. The desired reference voltage itself can be precisely determined and established, for example, by coupling a voltage divider circuit with a DC voltage source. The output of op-amp comparator 66 is electrically connected to a circuit node 67. A resistor 68 is electrically connected between node 67 and a node 69.

Furthermore, node 69 is also electrically connected to the anode of an LED 71 of an opto-isolator 70. The cathode of LED 71 is electrically connected to electrical ground. A photo-transistor 72 of opto-isolator 70 is electrically connected between a node 73 and a node 74 such that the emitter lead of photo-transistor 72 is connected to node 73, and the collector lead of photo-transistor 72 is connected to node 74. Photo-transistor 72 is an NPN-type transistor and is positioned relative to LED 71 in optical isolation so that LED 71 and photo-transistor 72 are optically linked whenever current passes through LED 71 and light emits therefrom. In this way, any light energy that is emitted from the LED 71 provides photo-transistor 72 with an activating base signal and permits the passage of current from the collector and to the emitter of photo-transistor 72. As an alternative to utilizing photo-transistor 72, other photo-sensors may instead be used in the opto-isolator 70 as well, such as, for example, a photo-resistor, a photo-diode, or a LASCR (light-activated silicon controlled rectifier).

A resistor 75 is electrically connected between node 74 and a circuit node 76. A diode 77, in turn, is electrically connected between node 76 and node 83 such that the cathode of diode 77 is connected to node 76, and the anode of diode 77 is connected to node 83. In addition, node 76 is also electrically connected to the collector lead of an NPN-type BJT (bipolar junction transistor) 78 while the base lead of transistor 78 is electrically connected to node 73. The emitter lead of transistor 78 is electrically connected to a circuit node 79. Concerning an NPN-type BJT 80, node 76 is electrically connected to the collector lead of transistor 80 while the base lead of transistor 80 is electrically connected to node 79. The emitter lead of transistor 80 is electrically connected to node 54.

Furthermore, a diode 82 is electrically connected between node 51 and node 83 such that the anode of diode 82 is connected to node 51, and the cathode of diode 82 is connected to node 83. A polarized capacitor 84 is electrically connected between node 83 and electrical ground such that the positive lead of polarized capacitor 84 is connected to node 83, and the negative lead of polarized capacitor 84 is connected to electrical ground. In general, capacitor 84 may be any known type of polarized capacitor, including, for example, either an electrolytic capacitor or a tantalum capacitor.

Figures 1, 4:
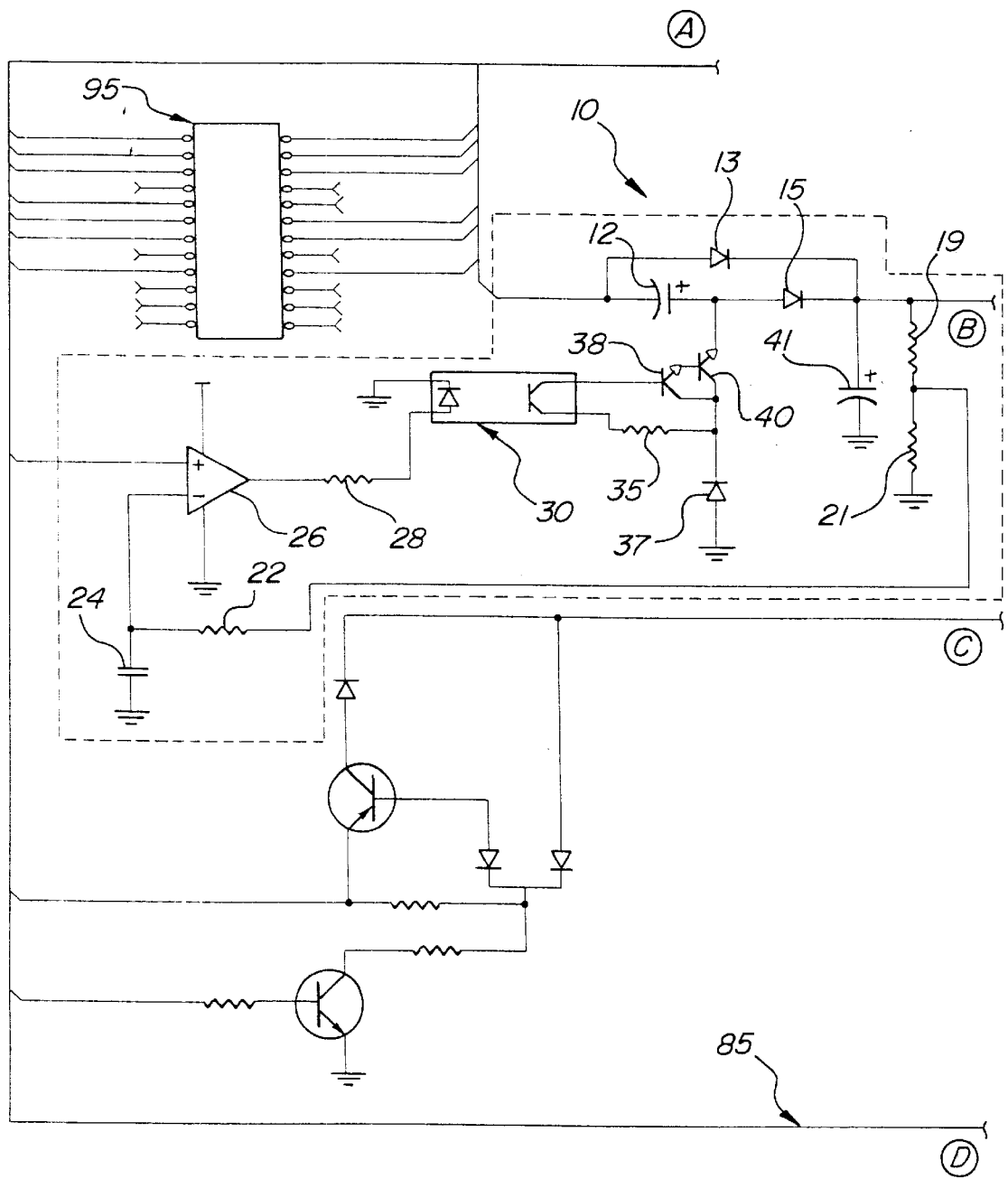
FIG. 4 is a circuit diagram of part of an electronic control system for the locomotive engine car of a toy model train which includes the present invention.
Figures 2, 4:
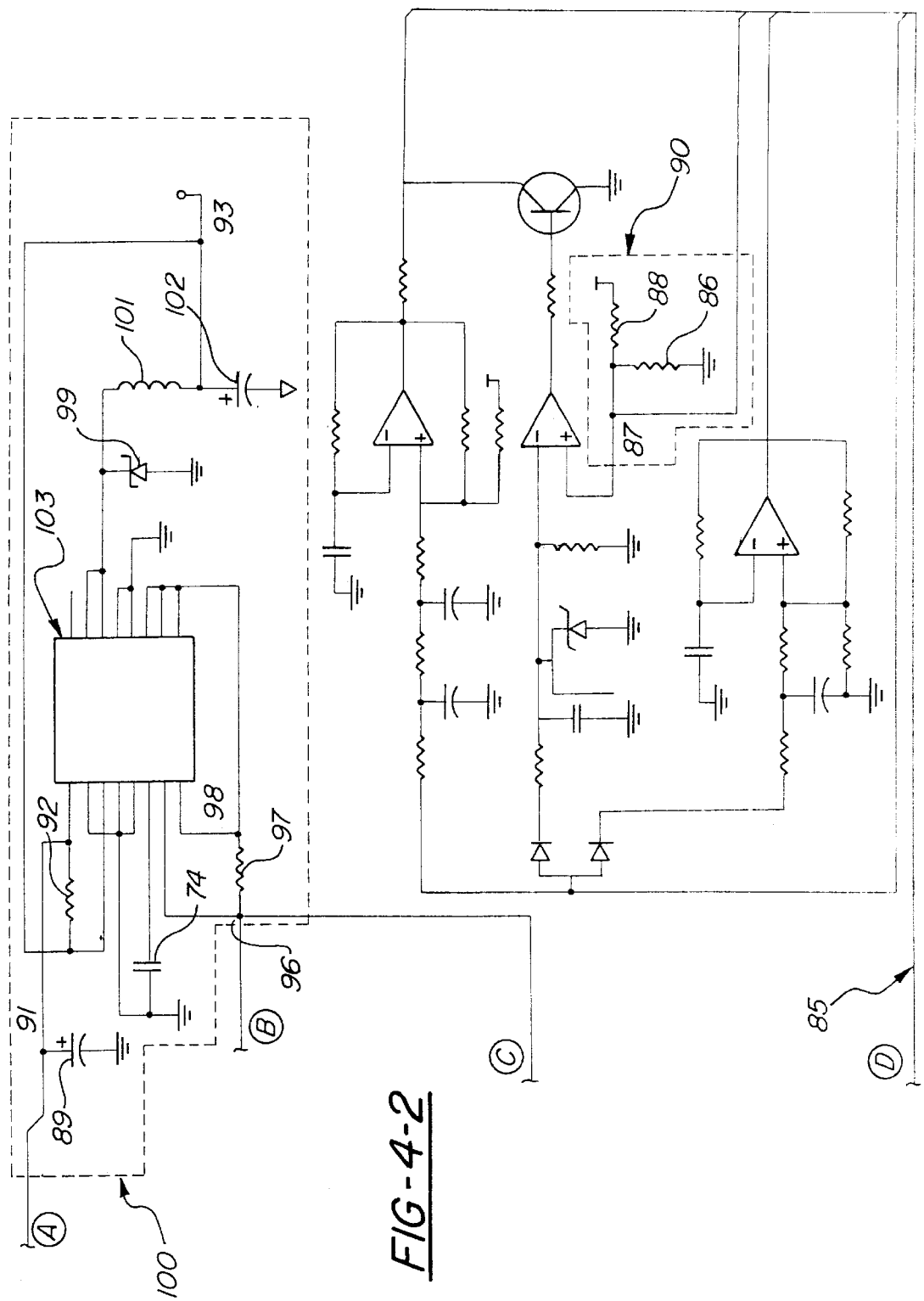

With reference to FIG. 4, there is shown a detailed circuit diagram of part of an electronic control system 105 for the locomotive engine car 9 of a model train incorporating voltage doubler sub-circuit 10, as previously discussed with regard to FIG. 2, a sub-circuit 90 for establishing a reference voltage for the voltage doubler 10, and a switching regulator sub-circuit 100 for interfacing with and providing audio amplification for a speaker system (not shown). In general, voltage doubler sub-circuit 10, sub-circuit 90 for establishing a reference voltage, and switching regulator sub-circuit 100 together make up an on-board portion of the electronic control system 105 whereas the remaining portions of the electronic control system 105 are generally housed within the electronic user control box 6 shown in FIG. 1. Thus, FIG. 4 essentially shows a significant portion of the electronic control system 105 for the locomotive engine car 9, both on-board and off-board portions. The on-board and off-board portions of the electronic control system 105 are generally electrically connected to each other via one or more rails incorporated within the train track 8. It is to be understood that, consistent with the present invention, the circuitry of FIG. 4 may be divided between on-board and off-board portions in a variety of different ways, for example, the circuitry may all be off-board.

In sub-circuit 90, the precise DC reference voltage to be applied to the non-inverting input of op-amp comparator 26 in sub-circuit 10 is established. To accomplish this, a resistor 88 is electrically connected between a circuit node 87 and a 5-volt DC voltage source. In addition, a resistor 86 is electrically connected between node 87 and electrical ground. Node 87 is electrically connected, via a bus 85, to the non-inverting input of op-amp comparator 26.

In the switching regulator sub-circuit 100, a switching regulator controller chip 103 (MC34163) is electrically connected to various circuit elements as dictated by manufacturer specifications. A resistor 92 is electrically connected between a circuit node 91 and a circuit node 93. Node 91, in turn, is electrically connected to lead 9 of a power/controller chip 95 (2559P24TD00) via bus 85 and is also electrically connected to lead 1 of switching regulator controller chip 103. A polarized capacitor 89 is electrically connected between node 91 and electrical ground with the positive lead of the polarized capacitor 89 is connected to node 91, and the negative lead of the polarized capacitor 89 is connected to electrical ground. In general, capacitor 89 may be any known type of polarized capacitor, including, for example, either an electrolytic capacitor or a tantalum capacitor.

In addition to being electrically connected to the resistor 92, the node 93 is also electrically connected to lead 3 of the switching regulator controller chip 103, a 5-volt DC voltage source, a switching inductor 101, and the positive lead of a polarized capacitor 102. The negative lead of polarized capacitor 102 is electrically connected to designated audio ground. Capacitor 102 may be any known type of polarized capacitor, including, for example, either an electrolytic capacitor or a tantalum capacitor. Switching inductor 101 is electrically connected between node 93 and leads 14 and 15 of the switching regulator controller chip 103. The cathode of a zener diode 99 is likewise electrically connected to leads 14 and 15 while the anode of zener diode 99 is electrically connected to electrical ground.

Further in FIG. 4, whereas leads 2, 4, 5, 12, and 13 of switching regulator controller chip 103 are electrically connected to electrical ground, a non-polarized capacitor 94 is electrically connected between electrical ground and lead 6 of switching regulator controller chip 103. In general, capacitor 94 may be any known type of non-polarized capacitor, including, for example, a ceramic disc capacitor, a mica capacitor, a paper capacitor, or a synthetic film capacitor. Leads 8, 9, 10 and 11 of the switching regulator controller chip 103, on the other hand, are all electrically connected to circuit node 98, whereas a resistor 97 is electrically connected between node 98 and a circuit node 96. Node 96 is electrically connected to voltage input lead 7 of switching regulator controller chip 103 as well as to the cathode of diode 13 and to the cathode of diode 15 in sub-circuit 10.

During operation, with reference to FIG. 2, an AC input voltage signal is received by voltage doubler 10 and is applied at node 11. Assuming polarized capacitor 12 has not been previously charged, the input voltage applied at node 11 passes to node 16 via diode 13. Once the input voltage passes to node 16, polarized capacitor 41 is charged up to a voltage level which approximates the voltage magnitude of the AC input voltage signal applied at node 11. As a result of the charging of polarized capacitor 41, the output voltage produced at nodes 16 and 18 will essentially be a positive DC voltage which approximates the positive-phase magnitude of the AC input voltage signal applied at node 11.

Further in FIG. 2, a representative, scaled-down sample of the DC output voltage at the node 16 is taken via a voltage divider circuit, comprised of resistors 19 and 21, and via resistor 22 and ultimately applied to the inverting input of op-amp comparator 26. Given that the op-amp comparator 26 is in an inverting configuration, if the DC voltage applied to the inverting input is greater in magnitude than the established DC reference voltage applied to the non-inverting input of op-amp comparator 26, then the output signal of op-amp comparator 26 produced at node 27 will be low. As a result, LED 31 of the opto-isolator 30 will not be activated, and the magnitude of the DC output voltage at node 16 will remain unaltered. In such a state, voltage doubler circuit 10 has, in essence, selectively disabled its voltage multiplying capacity and has deemed it unnecessary to change the magnitude of the input voltage before the input voltage is ultimately applied, for example, to the switching regulator sub-circuit 100 (in FIG. 4) and its associated audio speaker system (not shown).

Alternatively, if the DC voltage applied to the inverting input of op-amp comparator 26 is less in magnitude than the established DC reference voltage applied to the non-inverting input of op-amp comparator 26, then the output signal of comparator 26 produced at node 27 will instead be high. As a result, current will pass through LED 31 thereby activating it, and light will emit therefrom. LED 31 will then be optically coupled and linked with photo-transistor 32, and photo-transistor 32 will be activated and permit the passage of current through diode 37 during the negative phase of the input voltage signal applied at node 11. As a result, current will flow, via node 33, into the base of transistor 38, thereby permitting the flow of current from the collector to the emitter of transistor 38 and into the base of transistor 40, thereby also permitting the flow of current from the collector to the emitter of transistor 40. In this way, current ultimately passes through the polarized capacitor 12 during the negative phase of the AC input voltage signal at node 11.

As a direct result of current being permitted to pass through polarized capacitor 12 during the negative phase of the AC input voltage signal at node 11, polarized capacitor 12 will then be charged up and store a DC voltage having a magnitude that approximates the magnitude of the AC input voltage signal. The significance of this is that, once the polarized capacitor 12 is fully charged up, the series sum of the AC input voltage signal during its positive phase at node 11 and the stored voltage drop across charged polarized capacitor 12 will thereby produce a positive DC voltage, via diode 15, at node 16 which has a magnitude that approximates twice the voltage magnitude of the AC input voltage signal at the node 11. That is, the input voltage is essentially selectively doubled in magnitude.

During operation, with reference to FIG. 3, an AC input voltage signal is, first of all, received by the voltage tripler 50 and is specifically applied at node 51. Assuming polarized capacitor 52 has not been previously charged, the input voltage applied at node 51 essentially passes to node 56 via diode 53. At the same time, polarized capacitor 84 is soon charged up as well, as a result of current passing through diode 82, to a voltage level which approximates the voltage magnitude of the AC input voltage signal at node 51 while in its positive phase. Once the input voltage passes to the node 56, the polarized capacitor 81 and polarized capacitor 84 are together appropriately charged up to a series sum voltage level which approximates the voltage magnitude of the AC input voltage signal at node 51 while in its positive phase. As a result of the charging up of polarized capacitors 81 and 84, the output voltage at the circuit nodes 56 and 58 will essentially be a positive DC voltage which approximates the positive-phase magnitude of the AC input voltage signal applied at node 51.

Further in FIG. 3, a representative, scaled-down sample of the DC output voltage at node 56 is taken via a voltage divider circuit, comprised of resistors 59 and 61, and via resistor 62 and ultimately applied to the inverting input of op-amp comparator 66. Given that opamp comparator 66 is in an inverting configuration, if the DC voltage applied to the inverting input is greater in magnitude than the established DC reference voltage applied to the non-inverting input of the op-amp comparator 66, then the output signal of the op-amp comparator 66 produced at node 67 will be low. As a result, LED 71 of opto-isolator 70 will not be activated, and the magnitude of the DC output voltage at node 56 will remain unaltered. In such a state, voltage tripler circuit 50 has, in essence, selectively disabled its voltage multiplying capacity and has deemed it unnecessary to change the magnitude of the input voltage before the input voltage is ultimately applied, for example, to the switching regulator sub-circuit 100 (in FIG. 4) and its associated audio speaker system (not shown).

Alternatively, if the DC voltage applied to the inverting input of op-amp comparator 66 is less in magnitude than the established DC reference voltage applied to the non-inverting input of op-amp comparator 66, then the output signal of op-amp comparator 66 produced at node 67 will instead be high. As a result, current will pass through LED 71 thereby activating it, and light will emit therefrom. LED 71 will then be optically coupled and linked with photo-transistor 72, and photo-transistor 72 will thereby be activated and permit the passage of current through diode 77 during the negative phase of the input voltage signal applied at node 51. As a further result, current will flow, via node 73, into the base of transistor 78, thereby permitting the flow of current from the collector to the emitter of transistor 78 and into the base of transistor 80, thereby also permitting the flow of current from the collector to the emitter of transistor 80. In this way, current ultimately passes through polarized capacitor 52 during the negative phase of the AC input voltage signal at node 51.

As a direct result of current being permitted to pass through polarized capacitor 52 during the negative phase of the AC input voltage signal at node 51, polarized capacitor 52 will then be charged up and store a DC voltage having a magnitude that approximates twice the magnitude of the AC input voltage signal. More particularly, during the negative phase of the AC input voltage signal at node 51, the polarized capacitor 52 is charged up to a DC voltage which is approximately twice the magnitude of the input voltage signal due to the series sum of the voltage drop across the charged polarized capacitor 84 and the negative input voltage applied at node 51. The resulting significance of this is that, once polarized capacitor 52 is fully charged up, the series sum of the AC input voltage signal during its positive phase at node 51 and the stored voltage drop across the charged polarized capacitor 52 will thereby produce a positive DC voltage, via the diode 55, at node 56 which has a magnitude that approximates three times the voltage magnitude of the AC input voltage signal at the node 51. That is, the input voltage is essentially selectively tripled in magnitude.

It is to be understood that the present invention may be modified to selectively multiply an input voltage by either a factor of two or three, as illustrated in FIGS. 2 and 3, or may instead be modified to multiply by other factors as well.

During operation, with reference to FIG. 4, the sub-circuit 90 serves to establish a reference voltage for op-amp comparator 26 in sub-circuit 10. In this particular embodiment, sub-circuit 90 is comprised of a 5-volt DC voltage source coupled with a simple voltage divider circuit. The voltage divider circuit consists of resistor 86 and resistor 88 which together serve to thereby divide the 5-volt DC voltage so that a 1.2-volt DC reference voltage is established at node 87. As a result, the established reference voltage is electrically transferred, via bus 85, to the non-inverting input of op-amp comparator 26. Of course, other circuits, as are prevalent and known in the art, may instead be utilized to derive and establish a DC reference voltage. It is also to be understood that other reference voltages may instead be established and used to selectively activate the voltage multiplier according to the present invention.

Further in FIG. 4, an AC input voltage signal is applied to voltage multiplier circuit 10 via a rail of the train track 8 (in FIG. 1). The AC input voltage is then sampled via the resistor 19 and the resistor 22 and compared with the established 1.2-volt DC reference voltage by the op-amp comparator 26. As fully explained previously hereinabove with regard to FIG. 2, the AC input voltage is ultimately converted into a DC output voltage, the magnitude of which is determined as a result of the voltage comparison made by op-amp comparator 26.

Finally, the DC output voltage derived by the voltage doubler sub-circuit 10 is supplied to the switching regulator sub-circuit 100. More particularly, the DC output voltage supplied by voltage doubler sub-circuit 10 serves as a properly regulated voltage power source for properly activating and operating the switching regulator controller chip 103 and its associated audio speaker system (not shown) without risk of voltage overload and burn out. Thus, in the particular embodiment shown in FIG. 4 the voltage doubler sub-circuit 10 and switching regulator sub-circuit 100 together comprise part of the on-board electronic control system 105 for locomotive engine car 9 of a toy model train. In an alternative embodiment to that which is shown in FIG. 4, it may, of course, be more desirable under certain circumstances to incorporate a modified voltage tripler or other modified voltage multiplier with switching regulator sub-circuit 100 rather than incorporating the modified, selectively enabled voltage doubler 10. Simple and unmodified versions of such other alternative voltage multipliers are present in the art. See, for example, Forrest M. Mims III, *Getting Started in Electronics*, p.102 (Radio Shack Cat. No. 62-5003, 13th ed. 1996).

While the present invention has been described in what are presently considered to be the most practical and preferred embodiments, it is to be understood that the invention is not to be limited to the disclosed embodiments, but is intended to cover various modifications and equivalent arrangements included within the spirit and scope of the appended claims, which scope is to be accorded the broadest interpretation so as to encompass all such modifications and equivalent structures.

What is claimed is:

1. An electronic circuit for a model train which is activated by an input voltage, the electronic circuit comprising:
   a multiplier circuit which multiplies the input voltage;
   means for establishing a reference voltage;
   a comparator circuit for comparing the input voltage with the reference voltage, the comparator circuit electrically connected to the reference voltage establishing means, the comparator circuit producing an output signal depending on whether the reference voltage exceeds the input voltage; and
   an optical enabler which enables the multiplier circuit, the optical enabler electrically connected to the comparator circuit and the multiplier circuit, the optical enabler selectively enabling the multiplier circuit depending on the output signal of the comparator circuit.

2. The electronic circuit according to claim 1, wherein the multiplier circuit is a voltage doubler.

3. The electronic circuit according to claim 1, wherein the multiplier circuit is a voltage tripler.

4. The electronic circuit according to claim 1, wherein the reference voltage establishing means is comprised of a direct-current voltage source and a voltage divider circuit electrically connected to the direct-current voltage source.

5. The electronic circuit according to claim 1, wherein the comparator circuit is comprised of an operational amplifier.

6. The electronic circuit according to claim 1, the electronic circuit further comprising a speaker system electrically connected to the multiplier circuit.

7. The electronic circuit according to claim 1, wherein the optical enabler is an opto-isolator.

8. The electronic circuit according to claim 7, wherein the opto-isolator comprises a light-emitting diode and a phototransistor capable of being optically linked to the light-emitting diode.

9. An electronic audio system for a toy model train powered by an input voltage, the system comprising:
   a selectively activated voltage multiplier, connecting the input voltage to the audio system, which multiplies the input voltage if it is below a predetermined voltage level, wherein the audio system is comprised of a controller and a switching inductor electrically connected to the controller.

* * * * *